United States Patent

[11] 3,573,519

[72] Inventor Yoshimi Kumazawa
 Aichi ken, Nagoya shi, Japan
[21] Appl. No. 813,027
[22] Filed Apr. 3, 1969
[45] Patented Apr. 6, 1971
[73] Assignee Nippon Denso, Kabushiki, Kaisha
 Aichi ken, Kariya shi, Japan

[54] ROTORS FOR ALTERNATORS
 8 Claims, 6 Drawing Figs.
[52] U.S. Cl. .................................................. 310/156,
 310/71, 310/263, 310/269
[51] Int. Cl. ........................................................ H02k 21/12
[50] Field of Search ........................................... 310/156,
 159, 263, 171, 262, 260, 261, 269, 112, 114, 40,
 41, 71, 46, 267

[56] References Cited
 UNITED STATES PATENTS
| | | | | |
|---|---|---|---|---|
| 3,183,387 | 5/1965 | Wasynczuk | | 310/156 |
| 3,459,980 | 8/1969 | Coroller | | 310/114 |
| 450,219 | 4/1891 | Collins | | 310/269 |
| 1,991,046 | 2/1935 | Bohli | | 310/156 |
| 2,192,985 | 3/1940 | Reis | | 310/156 |
| 2,501,232 | 3/1950 | Mesh | | 310/269 |
| 2,579,318 | 12/1951 | Hershberger | | 310/156 |
| 3,447,012 | 5/1969 | Staebler | | 310/262 |

Primary Examiner—Milton O. Hirshfield
Assistant Examiner—R. Skudy
Attorney—Michael S. Striker ABSTRACT: The rotor of a dynamo for use in motorcycles or the like comprises two annular permanent magnets each having six equidistant radially outwardly extending pole pieces each of which is overlapped by a metallic pole shoe. The pole pieces of one of the magnets alternate with the pole pieces of the other magnet, and the two magnets are separated from each other by one or more ring-shaped distancing members. The magnets, their pole pieces, the pole shoes, the distancing members and the connectors for the pole shoes are embedded in a nonmagnetizable light metal so that the rotor resembles a short cylinder having an axial passage for reception of a drive shaft.

Patented April 6, 1971

3,573,519

INVENTOR:
Yoshimi KUMAZAWA

BY
his ATTORNEY

ROTORS FOR ALTERNATORS

BACKGROUND OF THE INVENTION

The present invention relates to alternators in general, and more particularly to improvements in revolving fields or rotors for alternators.

It is already known to employ in bicycles, motorcycles or other types of vehicles a dynamo whose rotor comprises a disc-shaped annular permanent magnet having a set of radially extending pole pieces each of which is overlapped by a pole shoe. The central opening of the permanent magnet accommodates a hub by means of which the rotor is mounted on a drive shaft. These parts form a skeleton structure which is embedded in a nonmagnetizable light metal so that the rotor resembles a cylinder.

The just-described rotor is preferred for use in dynamos of motorcycles because it is compact and because its weight is low. However, it was found that dynamos utilizing such rotors are unable to furnish sufficient amounts of electrical energy due to the fact that recent types of motorcycles embody an over increasing number of current-consuming devices. It is therefore desirable to employ on motorcycles dynamos which can produce substantial amounts of electrical energy without proportional increases in weight and bulk. The improvement which is closest at hand is to increase the number of pole pieces on the rotor. However, this entails an increase in the diameter of the rotor because the width of gaps between adjoining pole pieces cannot be reduced at will. As a rule, the diameter of the rotor for use in dynamos for motorcycles should not exceed 80 millimeters and should be preferably less, e.g. about 70 millimeters. A reduction in the width of gaps between adjoining pole pieces of a rotor of such size brings about an undesirable increase in the magnetic stray flux. Therefore, presently known rotors have a limited number of pole pieces, normally six.

SUMMARY OF THE INVENTION

An object of my invention is to provide a novel and improved rotor for dynamos of motorcycles and the like or analogous alternators wherein the number of pole pieces can substantially exceed the number of pole pieces in a conventional rotor of the same diameter.

Another object of the invention is to provide a rotor with more than six pole pieces wherein the pole pieces are sufficiently spaced from each other to prevent the generation of undesirable stray magnetic fluxes.

A further object of the invention is to provide a rotor wherein the pole pieces are distributed in a novel and space-saving way.

An additional object of the invention is to provide a rotor wherein the number of pole pieces is a multiple of the number of pole pieces in a conventional rotor of identical diameter.

The invention is embodied in a rotor which comprises a plurality (preferably two) annular permanent magnets which are coaxial with each other and each of which has radially extending pole pieces. The pole pieces of one of the permanent magnets are angularly offset with reference to the pole pieces of the other permanent magnet or magnets so that, when viewed in the circumferential direction of the rotor, the pole pieces of one magnet alternate with the pole pieces of the other magnet or magnets. The distances between the pole pieces of two adjoining permanent magnets can be increased, if necessary, by employing one or more preferably annular distancing members which are inserted between adjoining permanent magnets. Such distancing members may form integral parts of the permanent magnets or each thereof may constitute a discrete ring which is loosely inserted between the permanent magnets.

The novel features which are considered as characteristic of the invention are set forth in particular in the appended claims. The improved rotor itself, however, both as to its construction and the mode of assembling the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
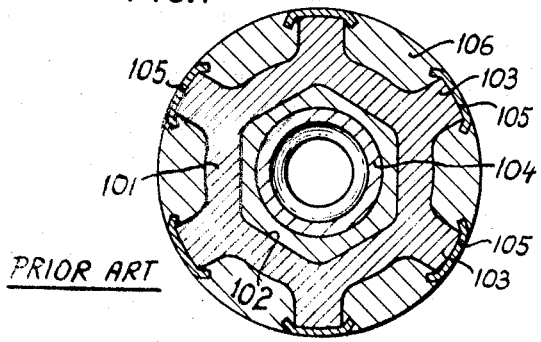
FIG. 1 is a sectional view of a conventional rotor.

FIG. 1 illustrates a conventional rotor or field for use in an AC generator or alternator. This rotor comprises an annular disc-shaped permanent magnet 101 having a central opening or passage 102 and six equidistant radially outwardly extending pole pieces 103. The opening 102 accommodates a metallic hub 104. The outer surface of each pole piece 103 is overlapped by a pole shoe 105. The skeleton structure including the permanent magnet 101, hub 104 and pole shoes 105 is embedded in nonmagnetizable light metal 106 so that the rotor forms a circumferentially complete cylindrical body.

Figure 2:
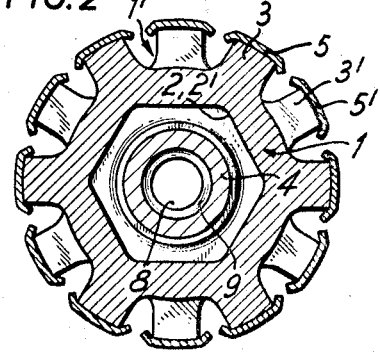
FIG. 2 is a sectional view of a rotor which embodies the present invention, substantially as seen in the direction of arrows from the line II–II of FIG. 4.
Figure 3:
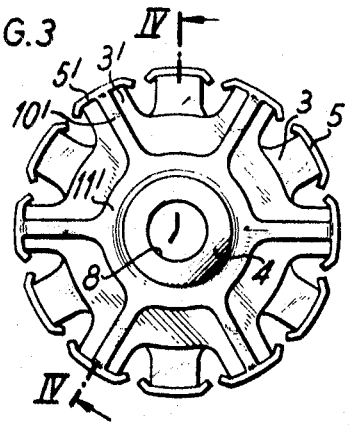
FIG. 3 is an end elevational view of the rotor as seen from the left-hand side of FIG. 4.
Figure 4:
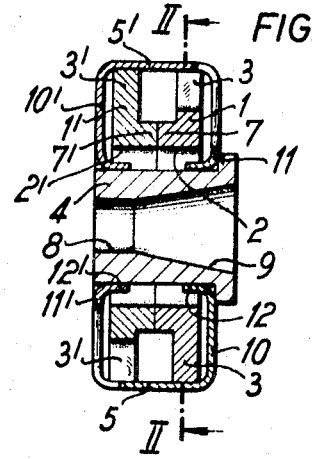
FIG. 4 is a sectional view as seen in the direction of arrows from the line IV–IV of FIG. 3.
Figure 5:
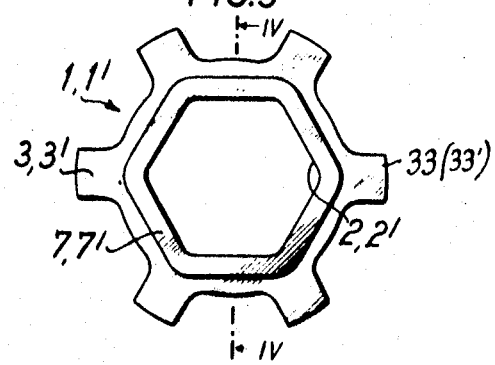
FIG. 5 is an end elevational view of one annular permanent magnet in the rotor of FIGS. 2—4.
Figure 6:
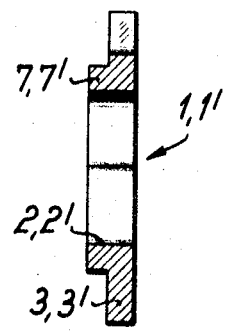
FIG. 6 is a sectional view as seen in the direction of arrows from the line VI–VI of FIG. 5.

FIGS. 2 to 4 illustrate a rotor or field which is constructed and assembled in accordance with one embodiment of my invention. This rotor comprises two annular permanent magnets 1, 1' which are of identical configuration. These magnets are shown in greater detail in FIGS. 5 and 6; each thereof is formed with a central opening or passage 2, 2', an annular distancing member 7, 7' and six equidistant pole pieces 3, 3'. Each of the distancing members 7, 7' surrounds the respective opening 2 or 2' at one axial end of the respective magnet. When the skeleton of the improved rotor is assembled in a manner as shown in FIGS. 2 to 4, the distancing members 7, 7' abut against each other (see particularly FIG. 4) so as to maintain the two sets of pole pieces 3, 3' at certain distance from each other, as considered in the axial direction of the rotor. Furthermore, the pole pieces 3 of the magnet 1 alternate with pole pieces 3' of the magnet 1' as considered in circumferential direction of the rotor. This is best shown in FIGS. 2 and 3. The arrangement is preferably such that, when looking in the axial direction of the assembled rotor, each pole piece 3 is located exactly midway between two adjoining pole pieces 3', and vice versa. It will be seen that, by the simple expedient of assembling the magnet of the rotor of a plurality of coaxial magnets (1 and 1'), the number of pole pieces on the composite magnet is multiplied without the need of placing the pole pieces too close to each other. This is due to the fact that the magnets 1, 1' are angularly offset with reference to each other and also to the fact that these magnets have distancing members 7, 7' which hold the plane of pole pieces 3 at a desired minimum distance from the plane of the pole pieces 3'.

The openings 2, 2' of the magnets 1, 1' are in registry and accommodate the major portion of an annular metallic hub 4 which has an axial bore 8 at one end and a second bore 9 which diverges in a direction away from the bore 8. Such configuration of the passage in the hub 4 enables it to be properly mounted on a drive shaft, not shown.

The outer surfaces 33, 33' of the pole pieces 3, 3' are overlapped by pole shoes 5, 5' of sheet steel. Each pole shoe 5 or 5' extends somewhat beyond the corresponding outer surfaces 33 or 33', as considered in the axial and circumferential directions of the rotor. Two connectors 11, 11' are respectively integral with the pole shoes 5 and 5' and are adjacent to the exposed end surfaces of the magnets 1, 1'. Each of these connectors includes a ring-shaped central portion and six radially extending arms 10, 10' each of which is integral with one of the pole shoes 5, 5'. It is preferred to construct the pole shoes 5, 5' in such a way that they are respectively integral parts of the connectors 11, 11'. Such connectors then consist of sheet steel. The ring-shaped central portions of connectors 11, 11' have axially extending inner portions 12, 12' which surround the adjoining end portions of the hub 4.

FIG. 4 shows that the pole shoes 5 extend axially well beyond the magnet 1 to overlap portions of gaps between the pole shoes 5'. Similarly, the pole shoes 5' overlie substantial portions of gaps between the pole shoes 5'. It can be said that the axial length of each pole shoe 5 or 5' almost equals the axial length of the rotor. Consequently, the north and south poles are closely adjacent to each other in a manner similar to that known from the so-called claw pole rotors. The structure shown in FIGS. 3 and 4 constitutes the skeleton of a complete rotor; such skeleton is thereupon encased in nonmagnetizable light metal in the same way as shown in FIG. 1. Thus, the ultimate product is a substantially cylindrical rotor.

The aforementioned ring-shaped distancing members 7, 7' of the rotor insure that the magnetic stray flux is relatively small despite the fact that the rotor comprises a large number of pole pieces. This is due to the fact that the distancing members 7, 7' maintain the annulus of pole pieces 5 at a predetermined minimum distance from the annulus of pole pieces 5'. The distance between the pole pieces 5 or 5', as seen in the circumferential direction of the rotor, is the same as in the conventional rotor of FIG. 1 despite the fact that the improved rotor comprises twice as many pole pieces and pole shoes. Such multiplication of the number of pole pieces is achieved without any increase in the outer diameter of the rotor. The axial length of the improved rotor slightly exceeds that of the conventional rotor shown in FIG. 1.

It is clear that the improved rotor is susceptible of many modifications without departing from the spirit of my invention. For example, at least one of the distancing members 7, 7' can be replaced by a discrete annular distancing member of magnetizable material which is loosely inserted between the two annular magnets. Furthermore, the rotor may be provided with fewer or more than 12 pole pieces, for example, with 10 or eight pole pieces; each of the annular magnets then comprises five or four pole pieces. Of course, if the number of pole pieces is reduced to such an extent that the distance between the pole pieces of the two magnets is sufficient without placing such pole pieces into two axially spaced planes, one or both distancing members 7, 7' can be dispensed with.

As stated before, each of the two connectors 11, 11' is preferably formed with integral arms 10, 10' and integral pole shoes 5, 5'. Such connectors then preferably consist of suitably deformed sheet steel or the like. However, it is also possible to make the pole shoes of sheet-coated material or to employ discrete pole shoes and to connect such discrete pole shoes to a preferably ring-shaped connector by means of rivets or in another suitable way. Such connectors are then preferably mounted in the same way as the connectors 11, 11', namely, at the exposed end surfaces of the respective magnets.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

I claim:

1. In a rotor for alternators, a combination comprising a plurality of coaxial annular magnets each having substantially radial extending pole pieces, said annular magnets including a pair of magnets adjacent to each other and the pole pieces of one magnet of said pair alternating with the pole pieces of the other magnet of said pair as seen in circumferential direction of said magnets, each magnet of said pair having an end surface facing away from the other magnet of said pair and said pole pieces having outer surfaces facing away from the common axis of said magnets; pole shoes overlying said outer surfaces of said pole pieces; and a pair of magnetizable connectors adjacent to each of said end surfaces of said magnets, each of said connectors being connected with the pole shoes overlying the outer surface of pole pieces on the respective magnet.

2. A combination as defined in claim 1, further comprising distance means between the magnets of said pair.

3. A combination as defined in claim 2, wherein said distancing means comprises an annular distancing member provided on at least one magnet of said pair.

4. A combination as defined in claim 2, wherein said distancing means includes at least one distancing member of magnetizable material.

5. A combination as defined in claim 1, wherein each of said connectors comprises a ring-shaped portion and substantially radially outwardly extending arms each connected with one pole shoe for the pole pieces of the respective magnet.

6. A combination as defined in claim 1, wherein each of said connectors is integral with the respective pole shoes.

7. A combination as defined in claim 1, wherein said magnets are provided with coaxial central passages and further comprising a metallic hub received in said passages, pole shoes each outwardly adjacent to one of said pole pieces, and a body of nonmagnetizable light metal in which said magnets and said pole shoes are embedded so that the rotor resembles a cylinder.

8. A combination as defined in claim 1, wherein each of the pole shoes overlying the outer surface of the respective pole piece of one magnet extends in axial direction into the space between two adjacent pole pieces of the other magnet.